(12) United States Patent
Chang et al.

(10) Patent No.: US 7,934,073 B2
(45) Date of Patent: Apr. 26, 2011

(54) METHOD FOR PERFORMING JUMP AND TRANSLATION STATE CHANGE AT THE SAME TIME

(75) Inventors: Chuan-Hua Chang, Taipei (TW); Hong-Men Su, Hsinchu County (TW)

(73) Assignee: Andes Technology Corporation, Science-Based Industrial Park, Hsinchu (TW)

( * ) Notice: Subject to any disclaimer, the term of this patent is extended or adjusted under 35 U.S.C. 154(b) by 1066 days.

(21) Appl. No.: 11/685,773

(22) Filed: Mar. 14, 2007

(65) Prior Publication Data

US 2008/0229054 A1 Sep. 18, 2008

(51) Int. Cl.
*G06F 12/00* (2006.01)
(52) U.S. Cl. ........ 711/206; 711/162; 711/163; 711/200; 711/202; 711/207; 711/208; 711/213; 717/138; 717/158
(58) Field of Classification Search .................. 711/162, 711/163, 209, 220, 200, 202, 206, 207, 208, 711/213; 717/138, 158
See application file for complete search history.

(56) References Cited

U.S. PATENT DOCUMENTS

| | | | | |
|---|---|---|---|---|
| 4,519,032 A | * | 5/1985 | Mendell | 711/173 |
| 5,319,760 A | * | 6/1994 | Mason et al. | 711/208 |
| 5,481,719 A | * | 1/1996 | Ackerman et al. | 718/108 |
| 6,463,582 B1 | * | 10/2002 | Lethin et al. | 717/158 |
| 6,687,813 B1 | | 2/2004 | Norman | |
| 7,681,012 B2 | * | 3/2010 | Verma et al. | 711/207 |
| 2007/0006200 A1 | * | 1/2007 | Renno et al. | 717/162 |

FOREIGN PATENT DOCUMENTS

| | | |
|---|---|---|
| TW | I240871 | 10/2005 |
| TW | I244038 | 11/2005 |
| WO | 2004015560 A2 | 2/2004 |

\* cited by examiner

*Primary Examiner* — Tuan V Thai
*Assistant Examiner* — Zhuo H Li
(74) *Attorney, Agent, or Firm* — Winston Hsu; Scott Margo

(57) ABSTRACT

A method for performing a jump and translation state change procedure at the same time is disclosed. The method includes: carrying out a series of instruction processing in a first function in a first translation state; and executing a jump instruction which jumps to a target address in a second function and initiates and completes a translation state change to a second translation state at the same time; wherein an address of a next instruction after the jump instruction is stored as a return address in a first register.

7 Claims, 3 Drawing Sheets

METHOD FOR PERFORMING JUMP AND TRANSLATION STATE CHANGE AT THE SAME TIME

BACKGROUND OF THE INVENTION

1. Field of the Invention

The present invention relates to data processing with a translation state change, and more particularly, to data processing wherein a jump and translation state change operation can be performed at the same time.

2. Description of the Prior Art

In conventional computer systems, data and program instructions are stored in a memory storage that can be addressed using either a virtual address or a physical address by a running program (i.e. a process). A process in User mode accesses the memory using virtual addresses, whereas a process in Kernel mode can use virtual addresses or physical addresses. When virtual addresses are used, the virtual addresses must be translated into corresponding physical addresses to access the physical memory in the computer system. Furthermore, the virtual address to physical address mapping is completely controlled by Kernel mode processes. This way, the User mode processes cannot access the memory unless allowed by the Kernel processes. This memory address translation is supported by a hardware device called a Memory Management Unit (MMU), which allows physical memory space to be allocated dynamically. In principle, a User mode process will always have the translation state turned on (i.e. using a virtual address), while a Kernel mode process can operate either with the translation state turned on (i.e. using a virtual address) or with the translation state turned off (i.e. using a physical address). The frequent memory space access operations include fetching program instructions, and reading and writing program data.

To service an external event while a computer system is running in a User mode program, the User mode process will be interrupted by the external event and the computer system will switch into running a Kernel mode process (e.g. an external event handler) with the translation state turned on or off, depending on different usage situations. The advantages of running with translation state turned on are that data is protected from corruption, as address mapping must occur for the physical memory to be accessed; and the data space can be dynamically managed such that shortage of usable physical memory will not cause a system crash. With the translation state turned off while accessing the memory, however, there are the advantages of not consuming MMU translation resources, not relying on translation information being ready in system error or boot conditions, and increasing the memory access performance by skipping all the necessary translation steps. Since translation On/Off states have their own advantages depending on different usage conditions, the Operating System (OS), and the main Kernel mode program, may elect to run in translation On or translation Off state.

In conventional systems, when an interrupt occurs, the translation state is first updated to a pre-determined translation state value, the system waits for a confirmation of the translation state change, then jumps to the Kernel mode interrupt handling program using the new translation state. In FIG. 1, all the above-mentioned operations are encompassed in the "Interruption" transition arrow line (102) from translation On state (101) to translation Off state (103). As can be seen in FIG. 1, the pre-determined new translation state is Off.

FIG. 1 is an example flowchart of a normal interruption handling procedure in the Kernel mode program in a computer system illustrating different steps placed in two columns based on the MMU translation On and Off states according to the conventional art. The procedure includes:

Step 101: User mode program data processing, and an interrupt is received;

Step 102: Interrupt accepted by hardware, transition from User mode to Kernel mode, and transition from translation On state to translation Off state, start to fetch Kernel mode program with translation Off;

Step 103: Kernel mode program instruction fetching and data processing under the translation Off state;

Step 105: Change Translation to On state by a Kernel mode program instruction;

Step 107: Execute an instruction to wait for translation state change to complete;

Step 109: Jump to Kernel mode program that needs to operate (fetching instruction, reading/writing data) under the translation On state;

Step 113: More Kernel mode program data processing under the translation On state;

Step 115: Change Translation to Off state by a Kernel mode program instruction;

Step 117: Execute an instruction to wait for change to complete;

Step 119: Jump (return) to Kernel mode program that needs to operate (fetching instruction, reading/writing data) under translation Off state;

Step 123: More Kernel mode program data processing under translation Off state;

Step 125: Return from Kernel mode program interruption handling to the interrupted User mode program;

Step 127: Continue User mode data processing after the interruption point with translation turned on.

When the system first moves to Kernel mode program data processing (Step 103) due to an interrupt event, the Translation State is changed to Off to ease the User mode to Kernel mode transition. After certain data processing is done under the translation Off state, there is a need to perform (call) some function which is required to operate under the translation On state. Therefore, at this time, a series of conventional individual operations are performed by program instructions to complete the function call. First, an instruction is used to change the translation state from Off to On (Step 105). Then, a special instruction is executed for the hardware system to wait for a confirmation of the change (Step 107) before executing the next step (jump instruction in Step 109). The jump instruction in Step 109 does not need to operate under translation On state. However, to ensure Step 113 does operate under translation On state starting from the program instruction fetching in Step 113, the instruction in Step 107 has to be performed before the jump instruction in Step 109 since the jump instruction in Step 109 has no way to guarantee a translation On state for the instruction in Step 113.

Under the conventional method, the instructions in Step 107 and Step 109 require identity mapping (making virtual address equal to physical address in the MMU address translation unit) of their instruction addresses, as the translation state when fetching these instructions cannot be determined precisely and can be either On or Off, depending on system timing. Please note that Step 107 (and Step 117) is placed across between the translation On and the translation Off columns in FIG. 1. Making these instructions identity mapped on their instruction addresses is doable in theory, but troublesome in practice. First, this defeats the purpose of using translation Off state to save MMU translation resources; further, this can slow down the program execution if translation steps need to be performed for these instructions; and additionally, it is harder to manage memory allocation when compared with normal non-identity-mapped memory management schemes.

When returning from the function that needs to operate under the translation On state to the calling function which needs to operate under the translation Off state, a similar series of conventional instructions needs to be executed (Step 115, Step 117, and Step 119). The same instruction address identity-mapping requirement is required for the instructions in Step 117 and Step 119.

SUMMARY OF THE INVENTION

With this in mind, the present invention aims to provide a method for a jump and translation state change procedure to solve the problems of the conventional art.

Therefore, a method according to an exemplary embodiment is disclosed. The method comprises: carrying out a series of instruction processing in a first function in a first translation state; and executing a jump instruction which jumps to a target address in a second function and initiates and completes a translation state change to a second translation state all at the same time; wherein an address of a next instruction after the jump instruction is stored as a return address in a first register.

Another exemplary embodiment of the disclosed invention comprises: carrying out a series of instruction processing in a first function in a first translation state; executing a jump instruction which jumps to a target address in a second function and initiates and completes a translation state change to a second translation state at the same time; storing an address of a next instruction after the jump instruction as a return address in a first register; storing the first translation state as a return translation state in a second register; and, after carrying out a series of instruction processing in the second function, executing a return instruction which retrieves the return address from the first register, retrieves the return translation state from the second register, and initiates and completes a translation state change to the return translation state and jumps to the return address at the same time.

These and other objectives of the present invention will no doubt become obvious to those of ordinary skill in the art after reading the following detailed description of the preferred embodiment that is illustrated in the various figures and drawings.

DETAILED DESCRIPTION

The present invention aims to provide a more efficient way of translation state change management, by performing a jump and translation state change operation at the same time.

The invention also eliminates the identity address mapping requirement/problem encountered by the memory address translation mapping management portion of the OS Kernel program. This will be further illustrated by the following embodiments and accompanying descriptions.

Figure 1:
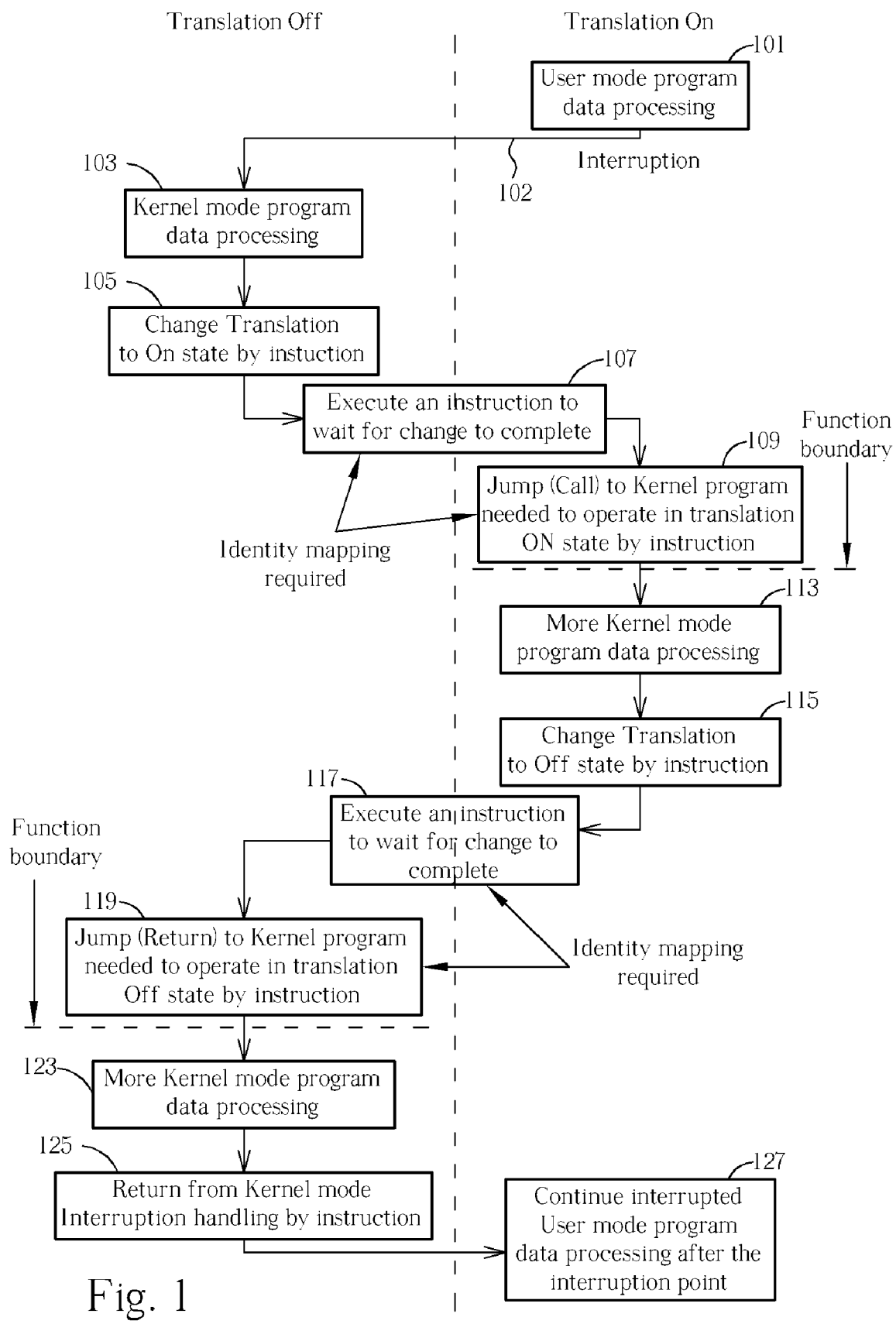
FIG. 1 is a flowchart of a method in an interruption handling procedure in the Kernel mode program in a computer system utilizing MMU translation On and Off states according to the conventional art.
Figure 2:
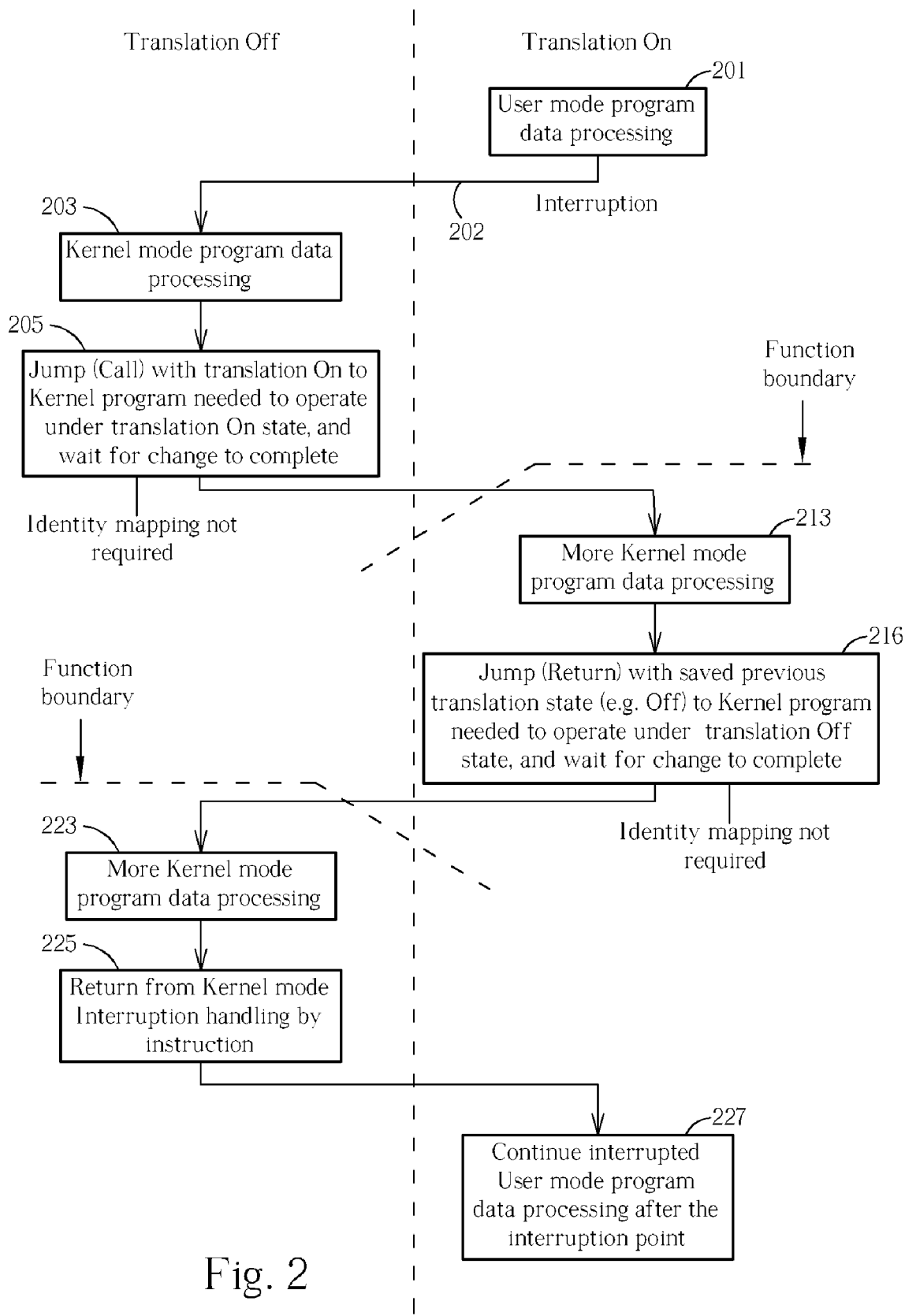
FIG. 2 is a flowchart of a method in an interruption handling procedure in the Kernel mode program in a computer system utilizing MMU translation On and Off states according to an exemplary embodiment of the disclosed invention.

In a first embodiment of the disclosed invention, a method is provided for performing a jump and translation state change operation at the same time (Step 205 and Step 216 in FIG. 2). In the Kernel mode interruption handling procedure (starting from Step 203 after the interruption transition 202 has occurred) the MMU translation state is initially Off. Then after a series of Kernel mode instruction processing under the translation Off state, there is a need to call (jump to) a Kernel function which is required to operate under the translation ON state. Therefore at this time, the invented jump/call instruction (Step 205) that initiates and completes a translation state change to a second translation state and jumps to a target address in a second function at the same time is executed to complete the function call procedure. The invented jump/call instruction will store the address of an instruction following this jump instruction to a register (called a link register) for later use as a return target address for a jump/return instruction. The invented jump/call instruction will also store the original translation state (e.g. translation Off in FIG. 2) in a translation state stack register for later use as a return target translation state for a jump/return instruction.

The invented jump/call instruction method prevents the identity-mapping problem mentioned in the conventional art. Since, at the time the jump/call instruction is being fetched the translation state has not been changed, the instruction address of the jump/call instruction either does not need to be translated or can be translated using the same translation mapping of the previous instruction for the jump/call instruction to be executed correctly. When the invented jump/call instruction completes, the translation state change is guaranteed to complete, and the MMU translation for the instruction fetching of the target instruction can also be determined without ambiguity. There is therefore no need to create a translation mapping of a virtual address equal to a physical address to prepare for a translation state change in the middle of executing the invented jump/call instruction.

After the invented jump/call instruction completes, the instructions in the second Kernel function that must be operated in a translation On state are being executed (Step 213). When this series of instruction processing completes, the procedure requires a return back to the first Kernel function that must be operated in a translation Off state. At this point therefore, a similarly invented jump/return instruction that initiates and completes a translation state change to the returned original translation state and jumps to a return address in the original function at the same time is executed to complete the function return procedure (Step 216). The returned original translation state is retrieved from the translation state stack register while the return address is retrieved from the link register by the invented jump/return instruction.

The invented jump/return instruction method prevents the identity-mapping problem mentioned in the conventional art. Since, at the time the jump/return instruction is being fetched the translation state has not been changed, the instruction address of the jump/return instruction either does not need to be translated or can be translated using the same translation mapping of the previous instruction for the jump/return instruction to be executed correctly. When the invented jump/return instruction completes, the translation state change is guaranteed to complete, and the MMU translation for the instruction fetching of the target returned instruction can also be determined without ambiguity. There is therefore no need to create a translation mapping of a virtual address equal to a physical address to prepare for a translation state change in the middle of executing the invented jump/return instruction.

Figure 3:
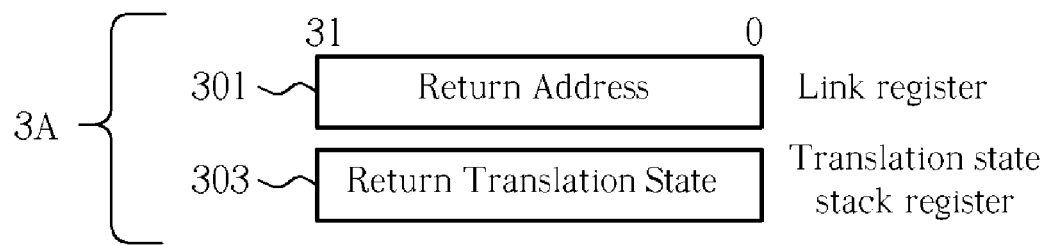
FIG. 3A is a diagram of a register structure according to a first embodiment of the disclosed invention.
FIG. 3B is a diagram of a register structure according to a second embodiment of the disclosed invention.
FIG. 3C is a diagram of a register structure according to a third embodiment of the disclosed invention.
Figure 3:
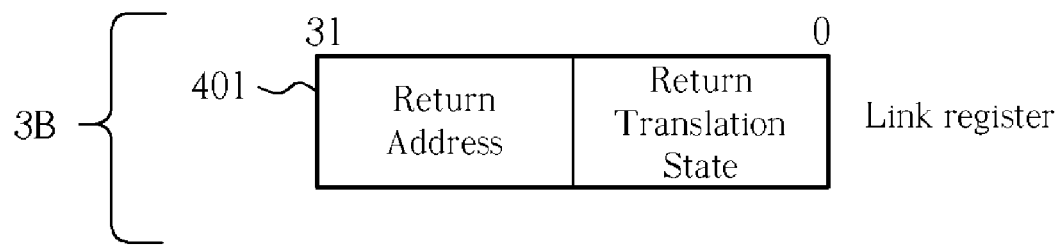
Figure 3:
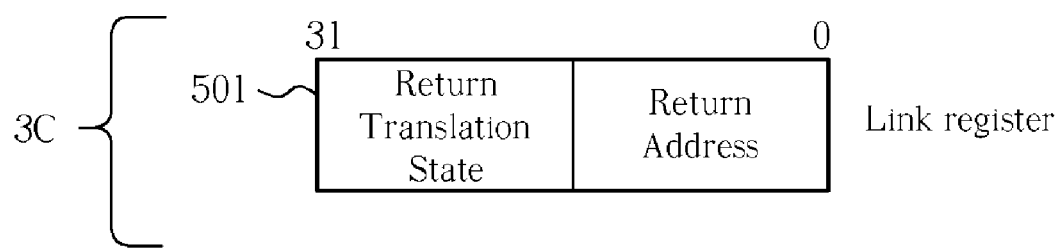

Please refer to FIG. 3. FIG. 3 shows three sub-diagrams 3A, 3B, and 3C respectively corresponding to the first embodiment, a second embodiment, and a third embodiment of the present invention. In this first embodiment, the translation state stack register and the link register are implemented as separate registers (FIG. 3A).

In a second embodiment, the translation state stack register can be implemented in the lower bits of the link pointer register (FIG. 3B). The translation state encoding can be stored in the lower (unused) bits of the return address, therefore when the return address is accessed, the return translation state can be accessed at the same time.

In a third embodiment of the disclosed invention, the translation state stack can be implemented in the higher bits of the link pointer register (FIG. 3C). The translation state encoding can then be stored in the higher (unused) bits of the return address, therefore when the return address is accessed, the return translation state can be accessed at the same time. Please note that both of these embodiments follow the spirit of the present invention.

FIG. 2 is a flowchart of a method in an interruption handling procedure in the Kernel mode program in a computer system illustrating different steps placed in two columns based on the MMU translation On and Off states according to an exemplary embodiment of the disclosed invention. The steps are as follows:

Step 201: User mode program data processing, and an interrupt is received;

Step 202: Interrupt accepted by hardware, transition from User mode to Kernel mode, and transition from translation On state to translation Off state, start to fetch Kernel mode program with translation off;

Step 203: Kernel mode program instruction fetching and data processing under translation Off state;

Step 205: Jump (call) with Translation On to Kernel mode program that needs to operate (fetching instruction, reading/writing data) under the translation On state, to ensure that the translation state change completes at the same time as the jump operation;

Step 213: More Kernel mode program data processing under translation On state;

Step 216: Jump (return) with saved previous translation state (e.g. Off) to Kernel program needed to operate under translation Off state, to ensure that the translation state change completes at the same time as the jump operation;

Step 223: More Kernel mode program data processing under translation Off state;

Step 225: Return from Kernel mode program interruption handling to the interrupted User mode program;

Step 227: Continue User mode data processing after the interruption point with translation turned on.

A fourth embodiment of the present invention does not need to utilize a translation state stack register. In this embodiment it is assumed that the previous translation state is known, therefore if a jump operation is performed with translation On, a return operation must be performed with translation Off. Similarly, if a jump operation is performed with translation Off, a return operation must be performed with translation On.

In a fifth embodiment of the present invention, an MMU in a computer system may have separate instruction fetching and data accessing translation states. In this case, the translation state will contain both instruction translation state information and data translation state information. It can be appreciated that it is not necessary for this information to be implemented in the same part of the link pointer register. Please note that this is just an example, and not a limitation of this embodiment.

Those skilled in the art will readily observe that numerous modifications and alterations of the device and method may be made while retaining the teachings of the invention.

What is claimed is:

1. A method for changing a translation state and jumping between program functions, the method comprising:
    carrying out a series of instruction processing in a first function in a first translation state; and
    executing a jump instruction in the first translation state which jumps to a target address in a second function and using execution of the jump instruction to initiate a translation state change from the first translation state to a second translation state, such that the translation state change is completed at the same time the jump instruction jumps to the target address, the step of executing a jump instruction further comprising:
        storing an address of the next instruction after the jump instruction as a return address in a first register; and
        storing the first translation state as a return translation state in a second register, wherein the return address stored in the first register has unused bits and the second register implemented is merged into the unused bits of the first register.

2. The method of claim 1, further comprising
    executing a return instruction in the second translation state which retrieves the return address from the first register, retrieves the return translation state from the second register, and initiates and completes a translation state change to the return translation state and jumps to the return address at the same time.

3. The method of claim 1, wherein the unused bits of the return address stored in the first register is in a lower part of the first register.

4. The method of claim 1, wherein the unused bits of the return address stored in the first register is in a higher part of the first register.

5. The method of claim 1, wherein each translation state comprises an instruction translation state and a data translation state, and the step of storing the first translation state in the second register comprises storing a first instruction translation state and a first data translation state in the second register.

6. The method of claim 1, wherein the first translation state is a translation on state, and the second translation state is a translation off state.

7. The method of claim 1, wherein the first translation state is a translation off state, and the second translation state is a translation on state.

* * * * *